United States Patent [19]
Webster

[11] 4,241,566
[45] Dec. 30, 1980

[54] COMBINE UNLOADING AUGER SAFETY SWITCH

[75] Inventor: E. Graham Webster, New Holland, Pa.

[73] Assignee: Sperry Corporation, New Holland, Pa.

[21] Appl. No.: 73,598

[22] Filed: Sep. 10, 1979

[51] Int. Cl.³ .................... A01D 75/18; A01D 57/00
[52] U.S. Cl. ............................ 56/14.6; 56/DIG. 15
[58] Field of Search .............. 56/14.6, 10.2, DIG. 15, 56/16.6

[56] References Cited

U.S. PATENT DOCUMENTS

| | | | |
|---|---|---|---|
| 3,626,472 | 12/1971 | Rowland-Hill | 130/27 T |
| 3,680,291 | 8/1972 | Soteropulos | 56/14.6 |
| 3,742,686 | 7/1973 | Rowland-Hill | 56/12.9 |
| 3,794,046 | 2/1974 | Muijs | 56/14.6 |
| 3,995,645 | 12/1976 | Rowland-Hill | 130/27 T |
| 4,093,087 | 6/1978 | DieCoene | 214/83.26 |

FOREIGN PATENT DOCUMENTS 2036301 2/1971 Fed. Rep. of Germany ............ 56/14.6

*Primary Examiner*—Paul J. Hirsch
*Attorney, Agent, or Firm*—R. D. D'Alessandro; Frank A. Seemar

[57] ABSTRACT

In a crop harvesting and threshing machine having an internal combustion engine operatively connected via an electrical circuit to a starter motor, a grain storage tank, an unloading auger movably mounted to an in material flow communication with the storage tank, a hydraulic cylinder operatively connected to the unloading auger to effect the movement of the unloading auger between a first inboard storage position and a second outboard unloading position, a control mechanism connected to the unloading auger between the first inboard position and the second outboard position and movable between first, second and third predetermined positions, the first predetermined position corresponding to the first inboard position and the second predetermined position corresponding to the second outboard position, there is provided a safety switch operatively connected to the electrical circuit and the hydraulic cylinder such that the control mechanism must be in the third predetermined position to permit the flow of electricity through the electrical circuit to start the engine when the starter motor is engaged, thereby preventing the unexpected movement of the unloading auger between the first inboard storage position and the second outboard unloading position upon starting of the engine.

21 Claims, 7 Drawing Figures

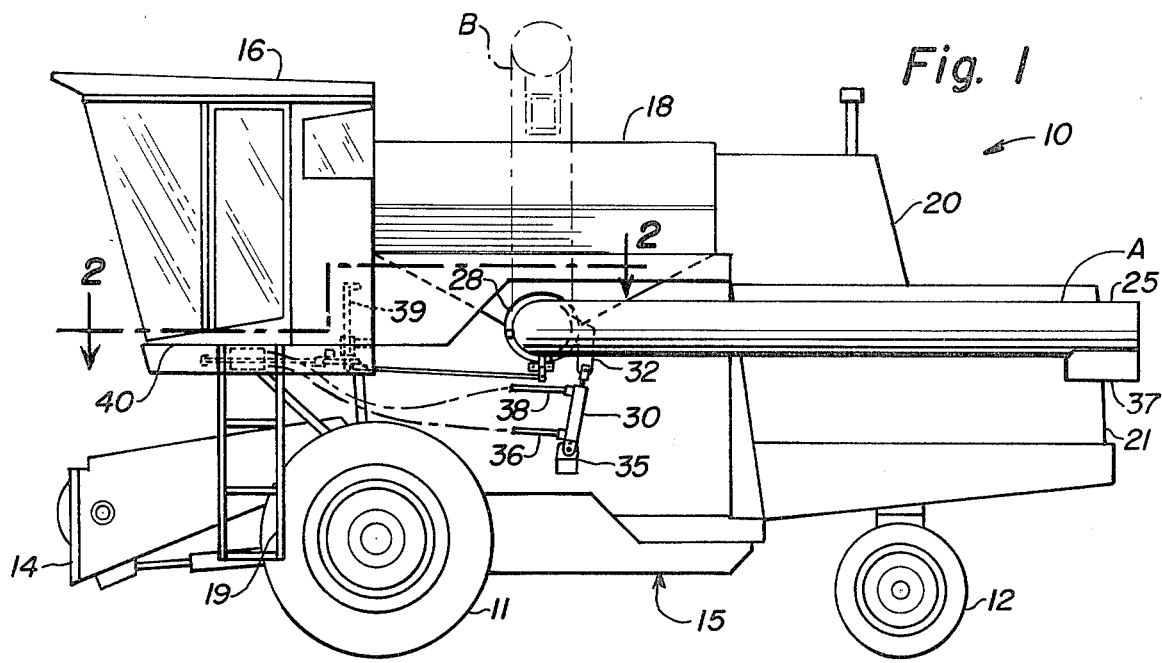
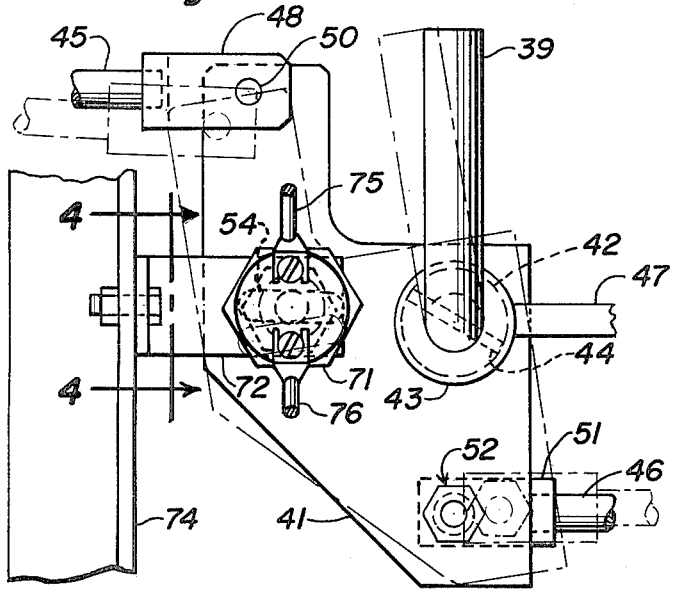
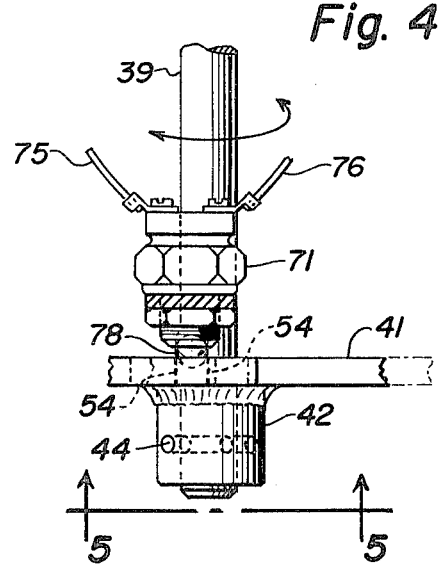
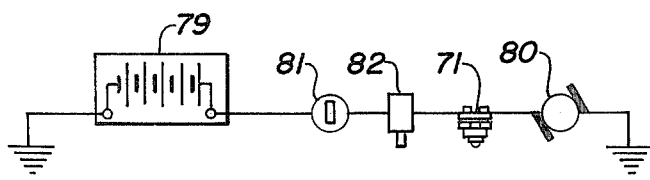
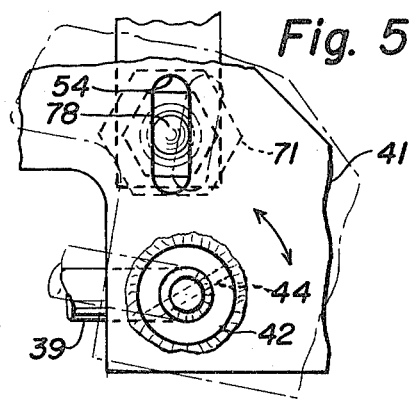

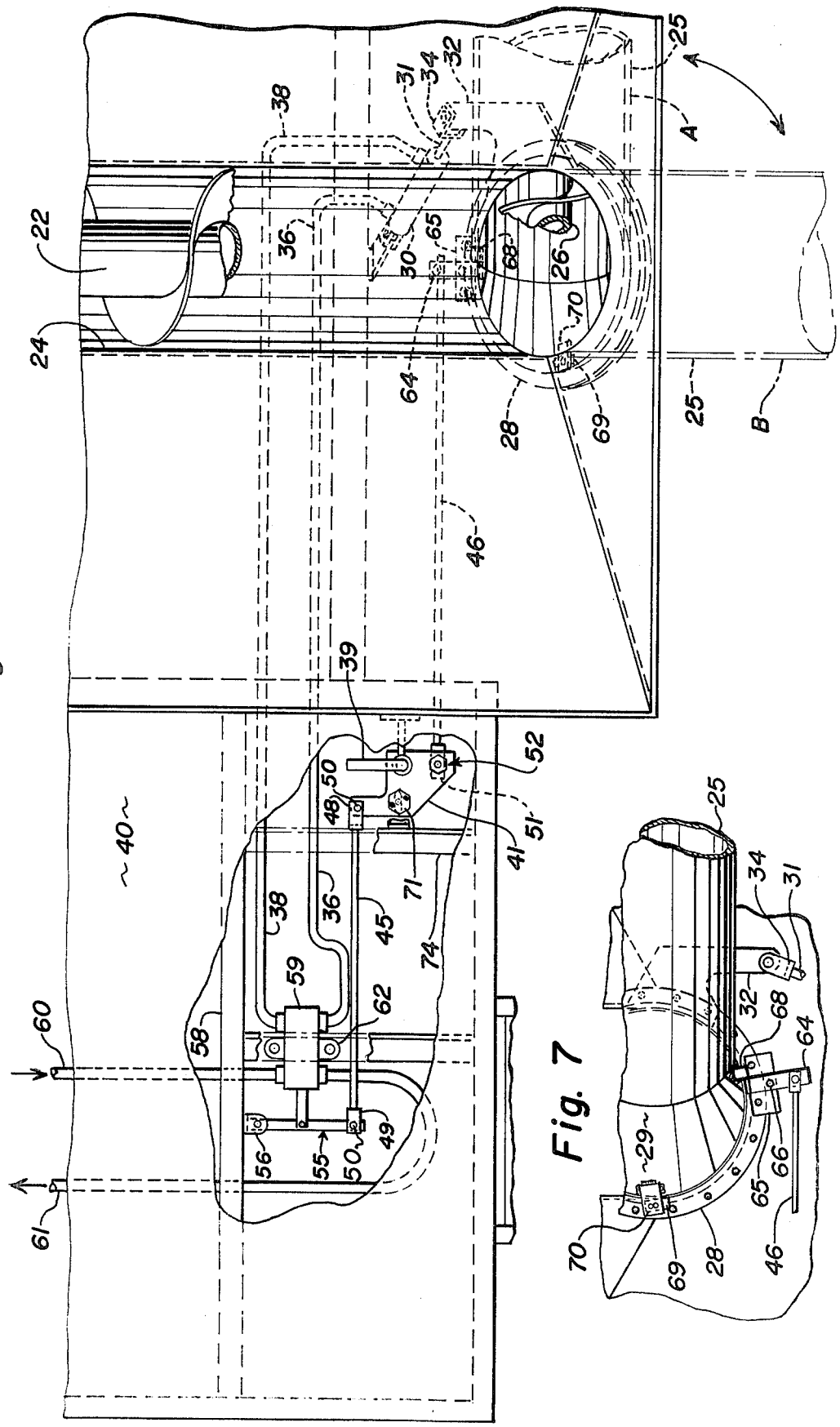

COMBINE UNLOADING AUGER SAFETY SWITCH

BACKGROUND OF THE INVENTION

This invention relates generally to crop harvesting and threshing machines, more commonly known as combines, and, more particularly, to the apparatus used to control the movement of the unloading auger by which clean grain is unloaded from the grain tank to a receiving vehicle. Specifically, the invention is directed to a control mechanism which permits the combine operator to start the engine on the combine only if the unloading auger control is in a predetermined position prior to the combine being started. Should the unloading auger control not be in the predetermined position, the safety switch breaks the starter circuit and prevents the combine from being started. This invention is applicable to all types of combines which utilize some type of a grain unloading tube that must move between predetermined positions of non-operation and operation.

Traditionally, combines utilize a grain storage system that has the threshed and cleaned grain transported by means of a collection trough and an auger to an elevator which carries the cleaned grain upwards into a receiving receptacle or grain storage tank. The grain is continuously fed into the grain tank during the operation of the combine as it harvests and threshes crop material in a field. The continuous field operation of a combine is generally limited by the capacity of the grain tank to store the cleaned grain. When the grain tank is full, the combine operator must normally cease the harvesting and threshing operation to unload the grain from the grain tank to a receiving vehicle. Occasionally, this unloading operation is conducted simultaneously with the continued harvesting and threshing by having a receiving vehicle move alongside the combine as it progresses down the field. The receiving vehicle may either be a wagon towed behind a tractor or a large grain truck. These receiving vehicles haul the loaded grain to appropriate storage areas generally remote from the field. This procedure is repeated continuously during the harvesting and threshing of the crop material. Combine operators normally activate the unloading system by engaging a lever or control which requires that the operator continue its engagement during the entire time that it takes the unloading tube to swing between its inboard and its outboard positions. Recently, control systems, such as that disclosed in U.S. application Ser. No. 059,852, filed July 23, 1979, and assigned to the assignee of the present invention, have been designed for combines which require the operator to momentarily engage a control mechanism which then automatically controls the movement of the unloading auger between the inboard and the fully outboard positions. The development of this type of a system has greatly simplified the number of operator functions that must be performed during the unloading of grain from the grain tank, especially if the unloading is done on the move.

However, this new type of unloading auger control system also presents a potential problem from a safety standpoint. Since the sub-systems on a combine will normally only operate when the engine is running or the ignition switch is turned to the on position, it is possible for an operator to accidentally engage the unloading auger control when the combine is not running or the ignition switch is not turned on. Additionally, since combines are present on farmsteads where it is common for children to climb on the parked machinery, it is plausible that the unloading auger control could be actuated by a child while within the operator's cab. Should this happen, it is possible that the operator would not know that the control has been actuated prior to his attempting to start the combine or turn the ignition switch to the on position. Should the combine be parked within an enclosed structure or near any type of obstruction in the path of the unloading auger as it moves between its inboard and outboard positions, the turning of the ignition switch would automatically start the unloading auger moving between its inboard and outboard positions. Obviously, since the unloading auger is of considerable mass, the movement of the unloading auger could cause severe damage to any object in its path. Alternately, should any obstruction be of substantial strength, such as a large tree or a supporting girder of a building, there could be substantial damage inflicted on the unloading auger. The foregoing problems are solved in the design of the machine comprising the present invention by preventing the combine engine from being started or the ignition circuit from being energized and the unloading auger from being activated to move between its inboard and outboard positions unless the unloading auger control is in its predetermined position prior to the ignition switch being turned to the one position by the combine operator.

SUMMARY OF THE INVENTION

It is a principal object of the present invention to provide in a combine an improved unloading auger control means in the form of a safety switch which requires that the unloading auger control be in a predetermined position prior to the ignition switch being turned to the on position and the combine started.

It is a further object of the present invention to provide a relatively simple mechanism that will prevent the unexpected movement of the combine unloading auger between its inboard and outboard positions upon the ignition switch being turned to the on position in combines utilizing a momentary hold type of unloading auger control system.

It is a feature of the present invention that the control means or safety switch includes a ball switch within the electrical starting circuit that is responsive to the positioning of the unloading auger control to permit the flow of electricity from the battery through the starter switch to the combine engine when the unloading auger control is in at least a first predetermined position and to not permit the flow of electricity through the circuit when it is in another predetermined position.

It is another feature of the instant invention that the safety switch cooperates with a slotted contact plate such that when the ball is in the slot the electrical circuit is complete and the fluid directional control valve controlling the flow of hydraulic fluid to the hydraulic cylinder is closed not permitting fluid to flow to the cylinder.

It is an advantage of the present invention that the automatic movement of the unloading auger between the inboard and outboard positions is prevented should the unloading auger control be in the normal position to activate the unloading auger prior to the starting of the combine engine or the turning of the ignition switch to the on position.

It is another advantage of the present invention that the accidental tripping of the unloading auger control after the combine has been shut down will not cause the unloading auger to move between the inboard and outboard positions automatically upon the subsequent restarting of the engine.

These and other objects and advantages are obtained by providing a safety switch operatively connected to the engine electrical starting circuit and the unloading auger hydraulic cylinder in a crop harvesting and threshing machine having an internal combustion engine, a grain storage tank, an unloading auger movably mounted to and in material flow communication with the storage tank, a hydraulic cylinder operatively connected to the unloading auger to effect the movement of the unloading auger between a first inboard storage position and a second outboard unloading position, a control mechanism connected to the unloading auger to selectively control the movement of the unloading auger between the first inboard position and the second outboard position and movable between first, second and third predetermined positions, the first predetermined position corresponding to the first inboard position and the second predetermined position corresponding to the second outboard position such that the control mechanism must be in the third predetermined position to permit the flow of electricity through the electrical circuit to start the engine when the starter motor is engaged, thereby preventing the unexpected movement of the unloading auger between the first inboard storage position and the second outboard unloading position upon starting of the engine.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a side elevational view of a crop harvesting and threshing machine with the unloading auger control means shown in phantom lines;

FIG. 2 is a top plan view in enlarged scale taken along the line 2—2 of FIG. 1 showing the mechanical linkages controlling the unloading auger control system, the safety ball switch and the ring of the unloading auger within which is rotatably driven the unloading auger by the hydraulic cylinder;

FIG. 3 is an enlarged top plan view of the ball switch and the control mechanism attached to the slotted contact plate that moves in response to the setting of the unloading auger control;

FIG. 4 is a side elevational view taken along the line 4—4 of FIG. 3 showing the safety ball switch, a portion of the unloading auger control lever and the slotted contact plate;

FIG. 5 is an enlarged plan view taken along the lines 5—5 of FIG. 4 showing in further detail the relationship and cooperation of the safety ball switch and the slotted contact plate;

FIG. 6 is an abbreviated circuit diagram showing the location of the safety ball switch within the starter circuit; and FIG. 7 is a side elevational view of the unloading auger ring and the hydraulic cylinder control linkage.

DETAILED DESCRIPTION OF THE PREFERRED EMBODIMENT

FIG. 1 shows a combine indicated generally by the numeral 10 in a side elevational view with the critical portions of the instant invention partially shown in detail in phantom lines. It can be seen that the combine 10 has a mobile frame mounted to a pair of primary driving wheels 11 in the front and a pair of smaller steerable wheels 12 in the rear. It is powered by an engine (not shown) which is usually diesel fuel consuming. The engine is mounted to the upper portion of the combine in suitable fashion and, by means of drive belts or sprocket chains, is drivingly connected to the operational components of the combine.

The combine 10 generally has a header (not shown) and an infeed housing 14 mounted at its front, as seen in FIG. 1. The combine 10 has a main frame or housing indicated generally by the numeral 15, that internally supports a threshing and separating means (not shown), as well as the operator's cab 16 and the grain tank 18. The operator's cab 16 extends forwardly over the front of the main frame 15 and overlies the infeed housing 14. The cab 16 has a ladder 19 which provides access for the operator to the cab and extends outwardly and downwardly therefrom. Housings 20 and 21 enclose the engine and the discharge beater and discharge grate assembly (both of which are not shown), respectively.

The structure thus far has been described generally since it is old and well known in the art. This structure and the interrelationships between the various operating components of the combine are described in greater detail in U.S. Pat. Nos. 3,626,472, issued Dec. 7, 1971; 3,742,686, issued July 3, 1973; and 3,995,645, issued Dec. 7, 1976; all to Rowland-Hill, hereinafter specifically incorporated by reference in their entirety, insofar as they are consistent with the instant disclosure.

The grain tank 18 has along its bottommost portion a horizontal grain tank unloading auger 22, best seen in FIG. 2, which is contained within an elongate, open-topped trough 24. As seen in FIGS. 1 and 2, the grain tank 18 has a pivotal unloading auger tube 25 within which is contained a rotatable auger 26, partially shown in FIG. 2. Tube 25 is fastened to the grain tank via an unloading auger ring 28 and a generally conically shaped intermediate connecting section 29, see briefly FIG. 7. This structure is shown and described in greater detail in U.S. Pat. No. 4,093,087, issued June 6, 1978, hereinafter specifically incorporated by reference in pertinent part insofar as it is consistent with the instant disclosure.

A double acting hydraulic cylinder 30, seen in its entirety in FIGS. 1 and 2, is fastened to the connecting section 29 of unloading auger tube 25 at the rod end 31 of the cylinder 30 via a mounting bracket 32 and double arm bracket 34. On its opposing end hydraulic cylinder 30 is fastened via bracket 35 to the combine frame and is best seen in FIG. 1. Rod-like fasteners or locking pins fasten the cylinder 30 to bracket 35 and also via the double arm bracket 34 of FIGS. 2 and 7 to bracket 32, thereby movably connecting the cylinder 30 to brackets 32 and 35. Hydraulic lines 36 and 38 of FIGS. 1 and 2 lead into opposing ends of the piston end of hydraulic cylinder 30. Hydraulic cylinder 30, upon activation, pivotally moves the unloading auger tube 25 with its auger 26 from an inboard storage or transport position illustrated as A in FIGS. 1 and 2 to an outboard unloading position illustrated as B. Tube 25 at its furthermost end has a discharge opening 37 through which crop material passes into a receiving vehicle when the tube is in the outboard position and it is desired to unload the grain tank 18.

FIGS. 3, 4 and 5 best show the interrelationship of the safety ball switch 71 and the unloading auger hydraulic cylinder control linkage. Control arm 39 extends from the operator's cab down through the floor 40 of the cab 16 where it is fixedly fastened to slotted contact plate 41. Control arm 39 passes through a hole in plate 41 and into a hub 42 which is welded to the underside of the plate. Pin 44, best shown in FIG. 3, fastens the control arm 39 to the hub 42 and contact plate 41. Control arm 39 passes through a suitably shaped opening (not shown) in the floor 40 of cab 16 and is retained for rotational movement by a bearing 43 and a brace member 47. Member 47 is fastened to the support structure of the floor 40. The size of this opening supports the control arm 39 sufficiently to permit the contact plate 41 to pivot about the axis of the control arm 39 when it is rotated by the combine operator.

Contact plate 41 is movably joined via the appropriate fastenings to connecting links 45 and 46, best shown in FIGS. 2 and 3. Connecting link 45 has on its opposing ends double arm brackets 48 and 49, see FIG. 2, through which fastening pin 50 passes to secure the link for movement. Fastener 50 and double arm bracket 48 thus secure the one side of contact plate 41 for rotational movement about the axis of the control arm 39. The opposing side of contact plate 41 similarly has connecting link 46 coupled to it via a second double arm bracket 51 with a bolt and retaining nut indicated generally by the numeral 52. Contact plate 41 also has an elongated slot 54 cut into it, best seen in FIGS. 3 and 5.

Connecting link 45 extends forwardly from contact plate 41 where it connects via bracket 49, as seen in FIG. 2, to a T-bar control link indicated generally by the numeral 55. Link 55 is anchored on its one end via a pivotal bracket 56 to a floor support beam 58. The leg of the T-bar control linkage connects to the spool (not shown) of a hydraulic fluid directional control valve 59. Typically the spool works with a detent (also not shown) to maintain the valve in an open position for a predetermined amount of time while the unloading auger tube 25 is moved between positions A and B. The hydraulic fluid directional control valve 59 controls the flow of hydraulic fluid through hydraulic lines 36 and 38 to the double acting hydraulic cylinder 30. Hydraulic fluid is forced to flow by a hydraulic pump (not shown) into the directional control valve 59 from the onboard reservoir (also not shown) via infeed line 60 and returns to the reservoir from the control valve 59 via hydraulic line 61. Fluid directional control valve 59 is suitably fastened to the underside of the cab floor 40, such as by bracket 62.

Connecting link 46 extends rearwardly from contact plate 41 where it is fastened to a tab 64 mounted to the auger ring 28 of auger tube 25 by mounting bracket plate 65 so that it pivotally moves about pivot point 66 in response to the pivotal movement of the contact plate 41 about the vertical axis of the control arm 39. A stop plate 68 is affixed to the intermediate connecting section 29 which serves to engage tab 64 when the unloading auger tube 25 returns to the inboard position illustrated as A in FIG. 1 to move the T-bar control linkage 55 via connecting linkages 45 and 46 and contact plate 41 to stop the flow of hydraulic fluid to the hydraulic cylinder 30. Another stop plate 69 is fastened via a bracket 70 to the intermediate section 29 so that stop plate 69 engages tab 64 when the unloading auger tube has reached the fully outboard position indicated by the letter B in FIG. 1 to stop the flow of hydraulic fluid to the hydraulic cylinder 30 in a similar fashion. Stop plate 69 may be adjustably fastened to mounting bracket 70 to permit stop plate 69 to engage the tab 64 within a controlled range and to correct minor manufacturing inaccuracies.

As seen in FIGS. 3, a normally on ball switch 71 is positioned generally over contact plate 41 by a mounting bracket 72 which is appropriately fastened to support beam 74 beneath the cab 16. Switch 71 has two electrical leads 75 and 76, respectively which connect the switch into the electrical starting circuit as illustrated in FIG. 6. A spring biased ball 78, best shown in FIGS. 4 and 5, extends out of the bottom of switch 71 and seats within slot 54 when the unloading auger control arm 39 has not been rotated either clockwise or counterclockwise from its neutral position to activate the unloading auger tube 25. FIGS. 3 and 5 best show the pivotal movement of contact plate 41 which causes the ball 78 to ride up out of the slot 54 and onto the surface of plate 41, thereby depressing the ball and causing the electrical circuit to be broken. As in the case of stop plate 69, the ball switch 71 may be adjustably mounted to ensure it is properly positioned to engage contact plate 41.

As diagrammatically illustrated in FIG. 6, safety ball switch 71 is interposed between the electrical power source or battery 79 and the combine starter motor 80. The ignition switch 81 is diagrammatically interposed between the battery 79 and the gear shift controls 82. From this abbreviated circuit diagram it can be easily seen that when the combine engine is not running or the ignition switch is not turned to the on position and the unloading auger control arm 39 is moved in either a clockwise or counterclockwise direction from its neutral center position to a position which would cause the flow of hydraulic fluid to pass through the hydraulic cylinder 30, the circuit is broken and prevents the starter motor from being engaged. This diagram also simply represents how a neutral safety switch can be incorporated within the gear shift 82 so that the combine cannot be started unless the transmission is in neutral.

In operation, the operator drives the combine 10 across a field harvesting the crop material. When the grain tank 18 is filled with grain, the operator engages the control arm 39 within the operator's cab 16. Control arm 39, when turned in a counterclockwise direction from its neutral or non-operating position, causes hydraulic fluid to flow through the hydraulic circuit into hydraulic cylinder 30 in such a manner as to cause the rod end to extend and rotate the unloading auger tube 25 and its unloading auger 26 from the inboard position illustrated as A to the outboard position illustrated as B. This counterclockwise pivoting of the control arm 39 causes the contact plate 41 to pivot about the vertical axis of control arm 39 and move the plate so that the ball 78 rides up and out of slot 54. When the unloading auger tube 25 has reached its fully outboard position, indicated by the letter B, stop plate 69 engages tab 64 causing it to pivot about pivot point 66 and forcing the spool within the hydraulic fluid directional control valve 59, via connecting linkages 45,46 and T-bar control linkage 55, to return to the position that terminates the flow of hydraulic fluid through the hydraulic circuit connecting the hydraulic cylinder 30. Should the operator desire to return the unloading auger tube 25 and its unloading auger 26 to the fully inboard position, indicated as A, he merely turns the control arm in a clockwise direction. This returns the unloading auger to the inboard position A in the same general manner by the reversal of the flow of hydraulic fluid through the circuit as indicated immediately above. The flow of hydraulic fluid is terminated by the stop plate 58 engaging the tab 64, thereby causing the same sequence of events described above to occur again.

Should the motor be shut down and the ignition turned off, the accidental engagement of the control arm 39 prior to turning the ignition switch on will not cause the unloading auger tube 25 and its unloading auger 26 to move between the fully inboard position (A) and the fully outboard position (B) because any such engagement will move the spring biased ball 78 out of the slot 54, thereby breaking the flow of electrical current to the starting motor. Thus, the harvesting and threshing machine cannot have its ignition turned to the on position and have the unloading auger 26 and its surrounding tube 25 unexpectedly move between the inboard and outboard positions as would normally occur when the control arm 39 is engaged in an unloading auger control system utilizing a momentary hold activation system.

It should also be noted that the safety ball switch could be connected via an appropriate circuit to an alarm system within the cab to alert the operator that the unloading auger control arm 39 is not in the neutral or non-operating position. The alarm system typically can be an audial or visual alarm, or a combination of both that will alert the operator to reposition the control arm 39 prior to any further operations.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention, what is claimed is:

1. In a harvesting and threshing machine for harvesting crop materials from a field by means of a header attached to a mobile frame cooperably associated with a feeder housing and crop processing means, the crop processing means being in material flow communication via transport means with a grain storage tank, the grain storage tank having an unloading means pivotally movable between at least a first predetermined position and a second predetermined position, the combination comprising:
   (a) an internal combustion engine mounted to the frame to drive the machine across a field;
   (b) an electrical power source mounted to the frame;
   (c) a starter motor connected to the engine to selectively start the engine;
   (d) an electrical circuit connected to the starter motor, the power source and the engine;
   (e) an ignition switch connected to the electrical starter circuit effective to allow the electricity to flow from the power source to the starter motor when the switch is engaged and the circuit is closed;
   (f) an unloading means control mechanism operatively connected to the grain storage tank unloading means and movable between at least a first non-operating position and a second activation position effective upon movement to the activation position to automatically pivot the unloading means between at least the first predetermined position and the second predetermined position;
   (g) a safety ball switch connected to the electrical circuit and cooperative with the unloading means control mechanism such that when the control mechanism is in the activation position and the engine is not running, the starter circuit is broken preventing the engine from being started when the ignition switch is engaged until the control mechanism is returned to the non-operating position.

2. In a harvesting and threshing machine controlled by an operator for harvesting crop materials from a field by means of a header attached to a mobile frame cooperably associated with a feeder housing and crop processing means, the crop processing means being in material flow communication via transport means with a grain storage tank, the grain storage tank having an unloading means pivotally movable between at least a first predetermined position and a second predetermined position, the combination comprising:
   (a) an internal combustion engine mounted to the frame to drive the machine across a field;
   (b) an electrical power source mounted to the frame;
   (c) an electrical circuit connected to the power source and the engine;
   (d) an ignition switch connected to the electrical circuit effective to allow the electricity to flow from the power source to the engine when the switch is engaged and the circuit is closed;
   (e) an unloading means control mechanism operatively connected to the grain storage tank unloading means and movable between at least a first non-operating position and a second activation position effective upon movement to the activation position to automatically pivot the unloading means between at least the first predetermined position and the second predetermined position;
   (f) an alarm system connected to the electrical circuit;
   (g) a safety ball switch connected to the electrical circuit and cooperative with the unloading means control mechanism and the alarm system such that when the control mechanism is in the activation position and the engine is not running, the alarm system is activated to alert the operator when the ignition switch is engaged to return the control mechanism to the non-operating position.

3. The harvesting and threshing machine according to claims 1 or 2 wherein the unloading auger control mechanism comprises a hydraulic fluid directional control valve with a flow control apparatus to control the flow of hydraulic fluid from a hydraulic fluid source to a hydraulic cylinder which controls the movement of the unloading means between at least the first predetermined position and the second predetermined position.

4. The harvesting and threshing machine according to claim 3 wherein the control mechanism further comprises a first linkage means and a second linkage means interconnected by a pivotal contact plate, the first linkage means being connected to the flow control apparatus of the fluid directional control valve so that the positioning of the flow control apparatus correspondingly causes the first linkage to move and via the contact plate moves the second linkage.

5. The harvesting and threshing machine according to claim 4 wherein the contact plate further includes a slot within which the safety ball switch rests when the control means mechanism is in the non-operating position and out of which the safety ball switch rides when the control mechanism is in the activation position.

6. The harvesting and threshing machine according to claim 5 wherein the second linkage means further comprises a connecting link having a first and a second end, the first being connected to the contact plate and the second end being connected to a pivoting tab, the tab being engageable by a plurality of stop plates mounted at predetermined locations on the unloading means to reposition the flow control apparatus via the contact plate and the first and second linkages to control the flow of hydraulic fluid to the hydraulic cylinder.

7. In a harvesting and threshing machine for harvesting crop material from a field having an internal combustion engine operatively connected via an electrical circuit to a starter motor, a grain storage tank, unloading means movably mounted in material flow communication with the storage tank, power means operatively connected to the engine and the unloading means to effect the movement of the unloading means between a first inboard storage position and a second outboard unloading position, control means connected to the electrical circuit and the unloading means to automatically control the movement of the unloading means between the first inboard position and the second outboard position upon activation and movable between at least a first predetermined position, a second predetermined position and a third predetermined position, the first predetermined position corresponding to the first inboard position and the second predetermined position corresponding to the second outboard position, the improvement comprising:

a safety switch operatively connected to the electrical circuit and the control means such that the control means must be in the third predetermined position to permit the flow of electricity through the electrical circuit when the starter motor is engaged to start the engine, thereby preventing the unexpected movement of the unloading means between the first inboard storage position and the second outboard unloading position upon starting of the engine.

8. In a harvesting and threshing machine controlled by an operator for harvesting crop material from a field having an internal combustion engine operatively connected via an electrical circuit to a starter motor, a grain storage tank, unloading means movably mounted in material flow communication with the storage tank, power means operatively connected to the engine and the unloading means to effect the movement of the unloading means between a first inboard storage position and a second outboard unloading position, control means connected to the electrical circuit and the unloading means to automatically control the movement of the unloading means between the first inboard position and the second outboard position upon activation and movable between at least a first predetermined position, a second predetermined position and a third predetermined position, the first predetermined position corresponding to the first inboard position and the second predetermined position corresponding to the second outboard position, the improvement comprising:

a safety switch operatively connected to an alarm system, the electrical circuit and the control means such that unless the control means is in the third predetermined position the alarm system is activated via the electrical circuit when the starter motor is engaged to start the engine, thereby alerting the operator to return the control means to the third predetermined position and preventing the unexpected movement of the unloading means between the first inboard storage position and the second outboard unloading position.

9. The harvesting and threshing machine according to claims 7 or 8 wherein the power means further comprises a hydraulic cylinder connected to a reservoir via a hydraulic circuit.

10. The harvesting and threshing machine according to claim 9 wherein the control means further comprises a hydraulic fluid directional control valve with a flow control apparatus to control the flow of hydraulic fluid from the reservoir to the hydraulic cylinder which controls the movement of the unloading means.

11. The harvesting and threshing machine according to claim 10 wherein the control means further comprises a first linkage means and a second linkage means interconnected by a pivotal contact plate, the first linkage means being connected to the flow control apparatus of the fluid directional control valve so that positioning of the flow control apparatus correspondingly causes the first linkage to move and via the contact plate moves the second linkage.

12. The harvesting and threshing machine according to claim 11 wherein the safety switch further comprises a ball switch such that when the ball is retracted the switch is open and when the ball is extended the switch is closed.

13. The harvesting and threshing machine according to claim 12 wherein the contact plate further includes a slot within which the ball safety switch rests when the control means has not been activated to move the unloading means between the first inboard storage position and the second outboard unloading position and out of which the ball rides when the control means has been activated to move the unloading means.

14. The harvesting and threshing machine according to claim 13 wherein the second linkage further comprises a connecting link having a first end and a second end, the first end being connected to the contact plate and the second end being connected to a pivoting tab, the tab being engageable by stop plates at predetermined locations on the unloading means to reposition the flow control apparatus via the contact plate and the first and second linkages to control the flow of hydraulic fluid to the hydraulic cylinder.

15. In a harvesting and threshing machine for harvesting crop material from the field having:
(a) a mobile frame;
(b) crop gathering means attached to the frame;
(c) crop infeed means mounted to the frame adjacent the gathering means;
(d) crop processing means mounted to the frame adjacent the infeed means;
(e) crop cleaning means mounted to the frame adjacent the processing means;
(f) a grain storage tank mounted on the frame in material flow communication with the cleaning means;

(g) unloading means rotatably mounted to the grain storage tank and in material flow communication therewith;

(h) power means to effect the rotation of the unloading means between an inboard storage position and an outboard unloading position;

(i) a power source to propel the harvesting and threshing machine;

(j) a starter motor connected via an electrical circuit to the power source to selectively start the harvesting and threshing machine;

(k) control means for the unloading means connected to the electrical circuit and the power means having at least a first predetermined position corresponding to the inboard position for the unloading means, a second predetermined position corresponding to the outboard position for the unloading means, and a third predetermined position, the control means selectively controlling the power means to automatically move the unloading means between the inboard and outboard positions upon activation; and (l) a safety switch operatively connected to the electrical circuit, the control means and the power means such that the control means must be in the third predetermined position to permit the flow of electricity through the electrical circuit to start the power source when the starter motor is engaged thereby preventing the movement of the unloading means between the inboard and outboard positions upon the starting of the power source.

16. The harvesting and threshing machine according to claim 15 wherein the power means further comprises a hydraulic cylinder connected via the hydraulic circuit to a central reservoir.

17. The harvesting and threshing machine according to claim 16 wherein the control means comprises a fluid directional control valve with a flow control apparatus connected to the hydraulic circuit effective to control the movement of the unloading means.

18. The harvesting and threshing machine according to claim 17 wherein the control means further comprises a first linkage means and a second linkage means interconnected by a pivotable contact plate, the first linkage means being connected to the flow control apparatus of the fluid directional control valve so the positioning of the flow control apparatus correspondingly causes the first linkage to move and via the contact plate moves the second linkage.

19. The harvesting and threshing machine according to claim 18 wherein the safety switch further includes a spring biased ball within the switch movable between a first position and a second position, the first position closing the electrical circuit and the second position opening the electrical circuit.

20. The harvesting and threshing machine according to claim 19 wherein the contact plate further comprises a slot within which the ball rests when the control means is in the third predetermined position and out of which the ball rides when the control means is in the first predetermined position and the second predetermined position.

21. The harvesting and threshing machine according to claim 20 wherein the second linkage further comprises a connecting link having a first end and a second end, the first end being connected to the contact plate and the second end being connected to the pivoting tab, the tab being engageable by stop plates at predetermined locations on the unloading means to reposition the flow control apparatus via the contact plate and the first and second linkages to control the flow of hydraulic fluid to the hydraulic cylinder.

* * * * *